(12) United States Patent
Royal et al.

(10) Patent No.: US 7,395,675 B2
(45) Date of Patent: Jul. 8, 2008

(54) SUPERCONDUCTING CABLE COOLING SYSTEM

(75) Inventors: John Henri Royal, Grand Island, NY (US); Barry Minbiole, Amherst, NY (US); Jalal Hunain Zia, Grand Island, NY (US); Nancy Jean Lynch, North Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 320 days.

(21) Appl. No.: 11/272,091

(22) Filed: Nov. 14, 2005

(65) Prior Publication Data
US 2007/0107443 A1 May 17, 2007

(51) Int. Cl.
*F25D 23/12* (2006.01)
*F17C 7/02* (2006.01)
*H01B 12/00* (2006.01)
*H01R 4/68* (2006.01)
*H02G 15/34* (2006.01)

(52) U.S. Cl. ............... 62/259.2; 62/50.1; 174/15.5; 505/885

(58) Field of Classification Search ............... 62/259.2, 62/6, 64, 50.1; 174/15.5, 15.4; 505/885
See application file for complete search history.

(56) References Cited

U.S. PATENT DOCUMENTS

| | | | |
|---|---|---|---|
| 4,015,437 A * | 4/1977 | Daus | 62/76 |
| 4,947,007 A * | 8/1990 | Dew et al. | 174/15.5 |
| 6,342,673 B1 * | 1/2002 | Verhaege et al. | 174/15.5 |
| 6,354,087 B1 * | 3/2002 | Nakahara et al. | 62/6 |
| 6,640,557 B1 | 11/2003 | Arman et al. | 62/50.7 |
| 6,644,038 B1 | 11/2003 | Acharya et al. | 62/6 |
| 6,732,536 B1 | 5/2004 | Bonaquist et al. | 62/50.5 |
| 6,864,417 B2 | 3/2005 | Bechis et al. | 174/15.1 |
| 6,895,765 B2 | 5/2005 | Bonaquist et al. | 62/50.5 |
| 2006/0150639 A1 * | 7/2006 | Zia et al. | 62/50.1 |
| 2007/0179062 A1 * | 8/2007 | Hirose et al. | 505/230 |

* cited by examiner

*Primary Examiner*—William C Doerrler
(74) *Attorney, Agent, or Firm*—David M. Rosenblum

(57) ABSTRACT

A superconducting cable cooling system, wherein coolant continually provides cooling to superconducting cable, comprising a plurality of nodes within a superconducting cable network and a plurality of legs of superconducting cable which interconnect each of the nodes of the superconducting cable network.

8 Claims, 3 Drawing Sheets

SUPERCONDUCTING CABLE COOLING SYSTEM

TECHNICAL FIELD

This invention relates generally to the provision of cooling or refrigeration to superconducting electrical transmission cables.

BACKGROUND ART

Electrical transmission through cables generates heat which reduces the efficiency of the electrical transmission, particularly over relatively long distances. This is especially the case when the electrical transmission cable is a superconducting cable.

Superconductivity is the phenomenon wherein certain metals, alloys and compounds, such as YBCO, REBCO and BSCCO, at very low temperatures lose electrical resistance so that they have infinite electrical conductivity. It is important in the use of superconducting cable to transmit electricity, that the cooling, i.e. refrigeration, provided to the superconducting cable not fall below a certain level lest the cable lose its ability to superconduct and the electrical transmission be compromised. While systems which can provide the requisite refrigeration to superconducting cable are known, such systems are costly, complicated and subject to breakdown. Moreover, known systems typically manifest an inefficient use of the coolant.

SUMMARY OF THE INVENTION

Apparatus for providing cooling to superconducting cable comprising a first node, a second node, a first leg of superconducting cable, a second leg of superconducting cable, means for passing coolant from the first node to the first leg of superconducting cable, means for passing coolant from the first leg of superconducting cable to the second node, and means for passing coolant from the second node to the second leg of superconducting cable.

As used herein the term "superconducting cable" means cable made of material that loses all of its resistance to the conduction of an electrical current once the material attains some cryogenic temperature.

As used herein the term "refrigeration" means the capability to remove heat from a subambient temperature entity.

As used herein the term "indirect heat exchange" means the bringing of entities into heat exchange relation without any physical contact or intermixing of the entities with each other.

As used herein the term "direct heat exchange" means the transfer of refrigeration through contact of cooling and heating entities.

As used herein the term "subcooled" means a liquid which has been cooled to be at a temperature lower than the saturation temperature of that liquid for the existing pressure.

As used herein the term "cryocooler" means a refrigerating machine able to achieve and maintain cryogenic temperatures.

As used herein the term "cryocooling station" means an arrangement comprising a cryocooler that provides refrigeration to a coolant.

As used herein the term "cryocooler/pumping station" means an arrangement comprising a cryocooler and a pump for receiving coolant, providing refrigeration to the coolant, increasing the pressure of the coolant, and transmitting the coolant.

As used herein the term "leg of superconducting cable" means a continuous segment encompassing superconducting cable wherein coolant enters at one end and exits at the other end.

As used herein the term "node" means a location where coolant may be added to or removed from a leg of superconducting cable. Examples of nodes include transitions between a superconducting line and a traditional, nonsuperconducting line, referred to herein as an electrical termination, such as in a substation; and a point in the superconducting grid where the coolant in any one leg can be transmitted to another. The respective superconducting cables may terminate in an electrical termination, or may continue as superconducting legs. The coolant could also be sent or obtained from a liquid cryogen tank, vented or otherwise removed from the cable network. The locations where a cryocooler, pump, or other non-storage device is placed in a leg of superconducting cable such that coolant flows through the device before being returned to the same cable are not considered nodes since the coolant is not fed or removed from the system at this point, and is not communicating with any other cables.

DETAILED DESCRIPTION

In general the invention comprises apparatus for setting up superconducting cable networks such that the cryogen, which is preferably liquid nitrogen, $LN_2$, effectively travels in loops, and in all loops the liquid nitrogen is actively cooling the superconducting cable. Cryocoolers and pumping stations can be distributed optimally along the length of each leg of the network or alternatively they can be located at the nodes. This eliminates the need for return lines for the liquid nitrogen, which offers several advantages. First both pumping requirements and the refrigeration load on the system per unit of power transmitted are reduced. There is no liquid nitrogen return loop, and therefore none of the heat leak and pumping losses associated with the return loop. Second, no ducts need to be dedicated to a return line—instead they can be used to route superconducting cables carrying power. This allows increased capacity utilization for an existing duct network. Third, overall reliability of the system is increased since each leg of superconducting cable may be supplied by more than one source of liquid nitrogen from other parts of the network.

Figure 1:
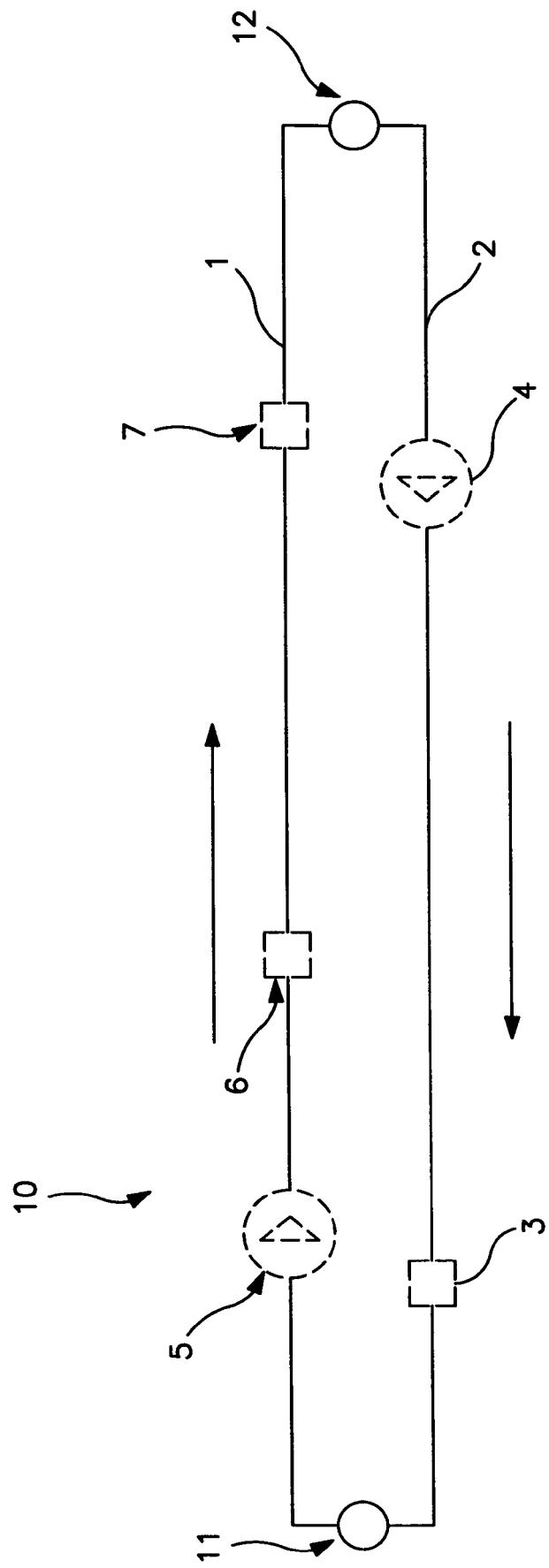
FIG. 1 is a schematic representation of one embodiment of the invention having two nodes and two legs of superconducting cable.

The invention will be described in greater detail with reference to the Drawings. Referring now to FIG. 1 there is shown superconducting cable network 10 which has two superconducting cables in parallel. Cable network 10 has a first node 11, a second node 12, a first leg of superconducting cable 1, and a second leg of superconducting cable 2. Coolant is passed from first node 11 to first leg 1. In the practice of this invention the coolant is preferably a liquid cryogen. The most preferred liquid cryogen for use in the practice of this invention is liquid nitrogen. Other coolants which may be used in the practice of this invention include liquid neon, liquid hydrogen, liquid helium, and mixtures of cryogenic liquids.

In the embodiment of the invention illustrated in FIG. 1 both first leg 1 and second leg 2 comprise both a pump and a cryocooler. First leg 1 comprises pump 5 and cryocoolers 6 and 7. Coolant passes from first leg 1 to second node 12, and coolant passes from second node 12 to second leg 2 which also comprises pump 4 and cryocooler 3. Coolant passes from second leg 2 back to first node 11.

The invention, such as in the embodiment illustrated in FIG. 1, eliminates the need for a return line. Instead of coolant cooling only one leg of the superconducting network and then returning to the starting point without providing any further cooling to superconducting cable, the coolant is further cooled en route to the starting point and provides cooling to a second leg of superconducting cable as it returns to the first node.

Figure 2:
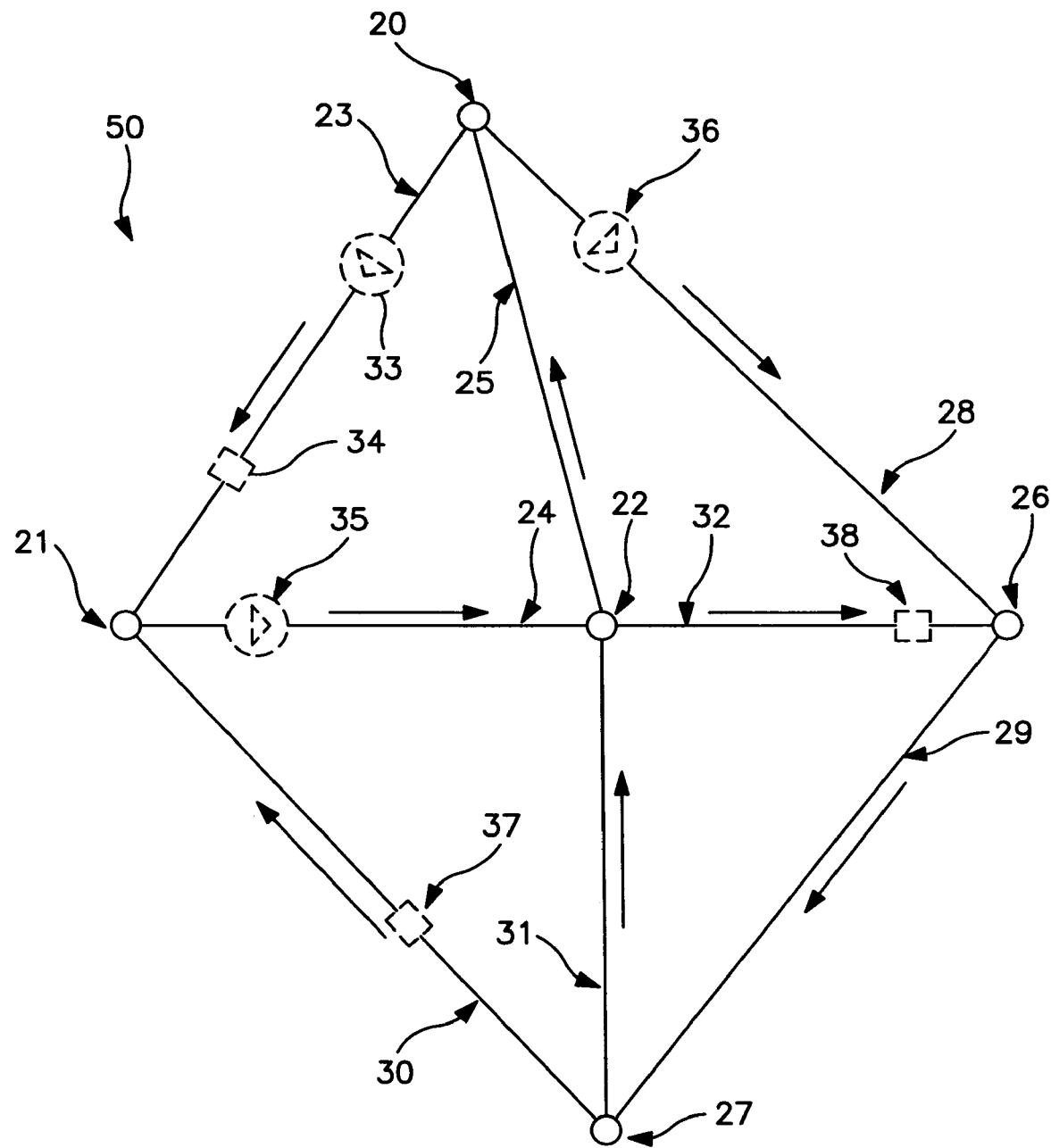
FIG. 2 is a schematic representation of one embodiment of the invention having more than two nodes and more than two legs of superconducting cable.

Another embodiment of the invention is illustrated in FIG. 2 which illustrates another superconducting cable network 50. In this embodiment there are several legs of superconducting cable and several nodes such that, in the event of a loss of coolant in any one leg, coolant flow and continued superconducting operation can continue in the other legs.

For purposes of illustration with reference to the embodiment of the invention illustrated in FIG. 2, node 20 may be the first node, node 21 may be the second node, and node 22 may be a third node. Leg 23 may be the first leg of superconducting cable, leg 24 may be the second leg of superconducting cable, and leg 25 may be a third leg of superconducting cable. Other nodes are labeled 26 and 27, and other legs of superconducting cable are labeled 28, 29, 30, 31 and 32. As is the case with the embodiment illustrated in FIG. 1, flow arrows depict the flow direction of coolant. The illustration of FIG. 2 also shows leg 23 comprising pump 33 and cryocooler 34, leg 24 comprising pump 35, leg 28 comprising pump 36, leg 30 comprising cryocooler 37, and leg 32 comprising cryocooler 38.

In the embodiment of the invention illustrated in FIG. 2, coolant flows between nodes 20, 21, 22, 26 and 27 in the direction shown by the flow arrows. Cryocoolers and pumps are optimally distributed along the lengths of each leg of the network. For example in leg 23 there is one pumping station and one cryocooler station. Each station may contain one or more cryocoolers and pumps respectively. Indeed each station may contain a combination of any number of cryocoolers and pumps. Leg 23 in this example will need to have distinct lengths of superconducting cable between the nodes and the pumping/cryocooler stations. In this network arrangement as with the other embodiments of this invention, the coolant does not need a dedicated return line between each node of the network. Each node has at least three connections to other nodes. If any one leg must be removed from service and cannot transport coolant such as liquid nitrogen through it, all of the other legs can continue to operate. It will require some changes to the flow circuits to keep all other legs cooled, such as reversing flow in certain legs, but the system has the built-in capability to handle an outage in one or potentially more legs while providing liquid nitrogen flow to all of the remaining legs.

Figure 3:
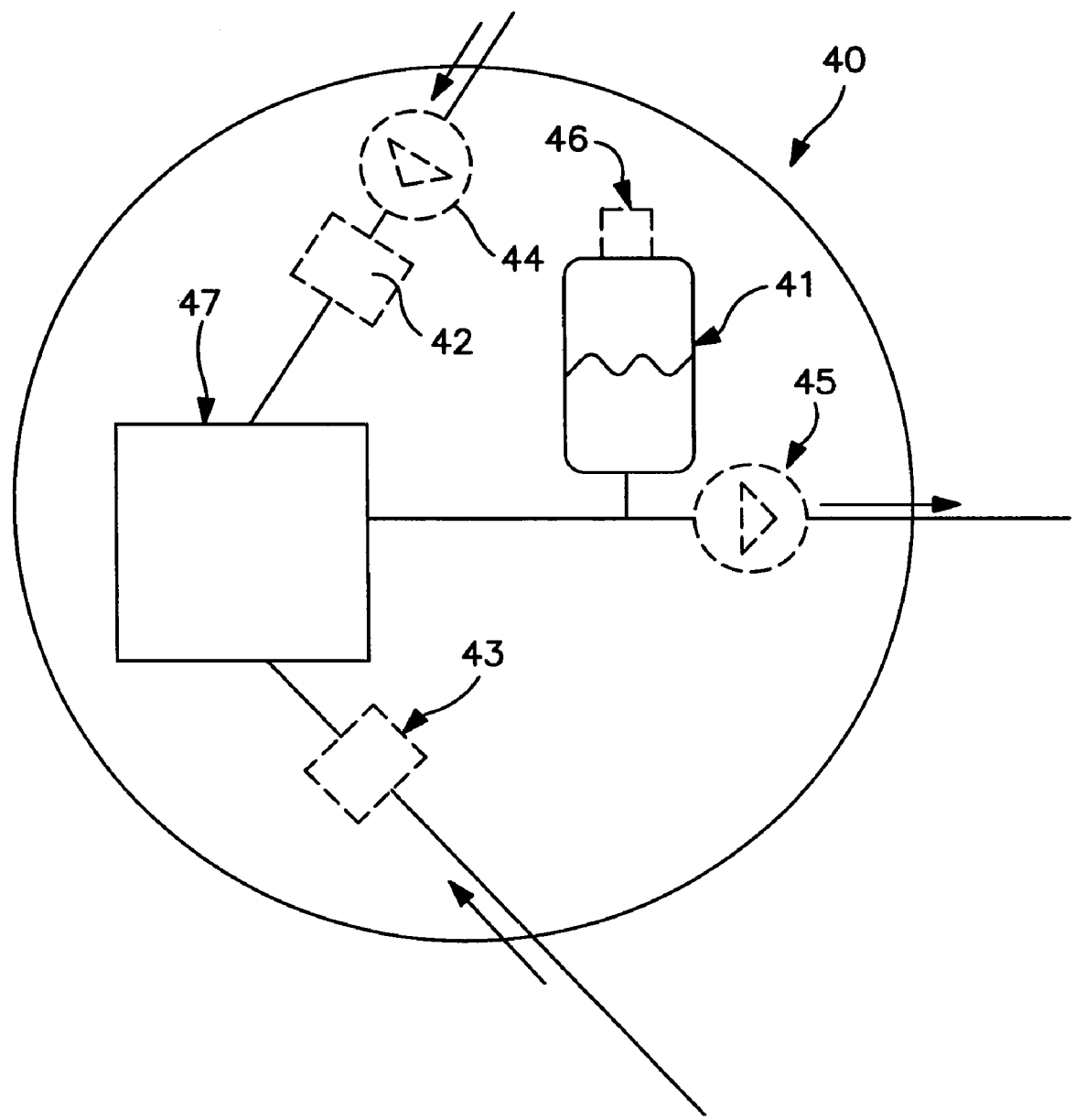
FIG. 3 is a representation of one embodiment of the invention wherein a cryocooler/pumping station is integrated into a node.

FIG. 3 shows a manifestation of this invention where the cryocooler and pump station(s) are integrated into a node, thus allowing a single length of superconducting cable to span a leg of superconducting cable. Each node, such as node 40 illustrated in FIG. 3, may incorporate one or more buffer tanks 41, cryocoolers 42 and 43 and cryogenic pumps 44 and 45. The buffer tank(s) allow considerable flexibility in the network in terms of coping with variable demand and cryocooler outages. Furthermore, if one leg of the network experiences a peak in demand, the coolant in the buffer tank can be brought into service. The coolant in the buffer tank may be kept at an optimum subcooled temperature by mounting a cryocooler 46 on the tank itself. In this manner peaks and troughs in demand in each leg of the network can be handled without the need to upgrade the system. In the system illustrated in FIG. 3, node 40 also comprises electric substation 47.

Although the invention has been described in detail with reference to certain preferred and illustrative embodiments, those skilled in the art will recognize that there are other embodiments of the invention within the spirit and the scope of the claims.

The invention claimed is:

1. Apparatus for providing cooling to superconducting cable comprising legs of the superconducting cable connected by nodes arranged in a superconducting cable network such that a coolant used in cooling the superconducting cable flows solely in the legs of the superconducting cable between the nodes and each of the nodes has at least three connections to other of the nodes by way of the legs of the superconducting cable such that when one of the legs of the superconducting cable is removed from service, coolant will circulate to remaining legs of the superconducting cable in the superconducting cable network, and means for circulating the coolant through the legs of the superconducting cable.

2. The apparatus of claim 1 wherein a cryocooler is positioned in at least one of the legs of superconducting cable.

3. The apparatus of claim 1 wherein the circulation means comprises a pump is positioned in at least one of the legs of superconducting cable.

4. The apparatus of claim 1 wherein the coolant comprises liquid cryogen.

5. The apparatus of claim 4 wherein the liquid cryogen comprises liquid nitrogen.

6. The apparatus of claim 1 wherein at least one of the nodes has a cryocooler.

7. The apparatus of claim 1 wherein the circulation means comprises a pump positioned in at least one of the nodes.

8. The apparatus of claim 1 wherein a buffer tank is incorporated into at least one of the nodes.

* * * * *